United States Patent [19]

Wright et al.

[11] Patent Number: 4,524,051
[45] Date of Patent: Jun. 18, 1985

[54] CATALYST PREPARATION AND OXIDATION OF CARBON MONOXIDE WITH SAID CATALYST

[75] Inventors: Christopher J. Wright, Abingdon; Christopher F. Sampson, Newbury, both of England

[73] Assignee: United Kingdom Atomic Energy Authority, London, England

[21] Appl. No.: 569,030

[22] Filed: Jan. 9, 1984

[30] Foreign Application Priority Data

Jan. 10, 1983 [GB] United Kingdom ............... 8300554

[51] Int. Cl.$^3$ ............... B01D 53/36; B01J 23/14; B01J 23/62
[52] U.S. Cl. ................... 423/247; 502/333; 502/334; 502/339; 502/349; 502/353; 423/213.5
[58] Field of Search ............ 423/213.5, 247; 502/333, 334, 339, 349, 352

[56] References Cited

U.S. PATENT DOCUMENTS 4,117,082  9/1978  Matsuyama ............... 423/247
4,317,460  3/1982  Dale et al. ............... 423/247 X

FOREIGN PATENT DOCUMENTS 1116585  6/1968  United Kingdom .
1563214  3/1980  United Kingdom .
1604081  2/1981  United Kingdom .
2028571  9/1982  United Kingdom .
2103953  3/1983  United Kingdom .
2083687  1/1984  United Kingdom .
2077136  1/1984  United Kingdom .
2126205  3/1984  United Kingdom .

*Primary Examiner*—Earl C. Thomas
*Attorney, Agent, or Firm*—Larson and Taylor

[57] ABSTRACT

A catalyst suitable for the catalysis of the oxidation of carbon monoxide is prepared by providing the substrate with tin (IV) oxide support material and with a catalytically active material.

The tin (IV) oxide is provided by contacting the substrate with a dispersion of colloidal or non-colloidal particles in a liquid medium, said dispersion being convertible to tin (IV) oxide by drying and firing, followed by drying and firing. A catalyst can be so-produced having low flow resistance, high low temperature activity and relative insensitivity to deactivation by moisture. The dispersion may, for example, be a tin (IV) oxide aqua-sol made, for example, by peptising hydrated stannic oxide with a quaternary ammonium hydroxide.

5 Claims, No Drawings

CATALYST PREPARATION AND OXIDATION OF CARBON MONOXIDE WITH SAID CATALYST

This invention relates to a method of preparing a catalyst suitable for the catalysis of the oxidation of carbon monoxide, which method comprises providing a substrate with tin (IV) oxide support material and with a catalytically active material.

There is much interest in the catalytic conversion of carbon monoxide to carbon dioxide by reaction with oxygen, for example in the following circumstances. Thus, when the CO concentration in mines becomes critical, personnel therein make use of breathing masks attached to catalyst cannisters so that ingested air passes through the cannister to remove CO catalytically. Secondly, there is a need to remove CO from the combustion products of cigarettes. (See, for example U.K. Pat. No. 1,604,081.) Thirdly, in use of $CO_2$ lasers, dissociation of the $CO_2$ to CO and $O_2$ takes place until a critical concentration of $O_2$ is reached at which arcing occurs within the laser cavity thereby preventing further lasing. There is therefore a need to effect catalytic recombination of the CO and $O_2$. (See, for example U.K. Patent Specification No. 2,028,571.) Fourthly, in $NH_3$ synthesis when an iron catalyst is used, CO will poison the catalyst and must therefore be removed from the feed gas stream. This can be done by catalytic conversion to $CO_2$ following injection of oxygen into the process stream. The catalytic oxidation of CO in an ammonia synthesis process using a $Pt/Al_2O_3$ catalyst containing traces of Fe, Ni or Co is described in U.K. Pat. No. 1,116,585.

The above examples may, however, have particular problems. Thus, the first example requires the air to be dry. A drying agent therefore has to be provided which increases weight and requires elaboration of the apparatus used. The third example requires the catalyst to offer low resistance to flow and to be substantially dust-free in operation, and the first three examples require the catalyst to be active at a temperature of around 20° C.

The invention enables a catalyst to be prepared which may ameliorate the above problems. The use of the catalyst is principally but not exclusively for the oxidation of CO; thus, the catalyst may, for example, have low temperature catalytic activity in the oxidation of gases other than CO.

The invention provides a method of preparing a catalyst comprising providing a substrate with tin (IV) oxide support material and with catalytically active material, characterised in that the tin (IV) oxide is provided by contacting the substrate with a dispersion of colloidal or non-colloidal particles in a liquid medium, said dispersion being convertible to tin (IV) oxide by drying and firing, followed by drying and firing.

It should be noted that the tin (IV) oxide may itself be catalytically active and/or may participate in some way in chemical reactions involving use of the catalyst of the invention. In any event, the term "catalytically active material" used in this specification is to be taken to exclude tin (IV) oxide. "Tin (IV) oxide" includes stoichiometric $SnO_2$ and also non-stoichiometric compounds having the formula $SnO_{2-x}$ where x is finite and is a small fraction.

The method of the invention offers several advantages as follows. A catalyst can be produced with low resistance to flow therethrough; the catalyst may have high catalytic activity at low temperatures; the catalyst need not suffer from significant attrition and produce dust; the catalyst is relatively insensitive to deactivation by moisture.

The substrate may be non-metallic or metallic, though the former is preferred. It may, for example, be constituted by a single artefact in the form of a porous ceramic such as porous $\alpha$-$Al_2O_3$ or cordierite fabricated into a monolith having a plurality of internal channels for gas flow. If a single artefact is incapable of providing the desired activity, a plurality of artefacts may be used to constitute the substrate. In order to prevent attrition in use of a plurality of artefacts, the artefacts may have to be fixed rigidly either to one another or to a further substrate in order to minimise relative displacement between abrasive surfaces. If, however, a low level of attrition is not a serious problem, as in the above-mentioned oxidation of CO in ammonia synthesis, it may be possible to use a plurality of non-rigidly fixed artefacts as the substrate when treated according to the invention. The artefacts may be ceramic or metallic and may be monoliths, beads, rings or other forms. If they are monoliths, they may be randomly or non-randomly packed, for example as described in U.K. Patent Specification Nos. 2 077 136A and 2 103 953A respectively.

Another form of substrate for use in the present invention may be a metal support carrying a porous ceramic material, for example, applied to the metal by methods known in the art. Such a substrate could be constituted, for example, by internal components, such as walls of a container or reactor within which it is desired to catalytically combine CO and oxygen. Thus, the internal components may be catalytically activated by being converted to a substrate as above and then treated according to the invention. U.K. Patent Specification No. 2 083 687A describes a $CO_2$ laser containing coated components.

The catalytically active material may be a precious metal or a combination of precious metals such as Pt, Rh, Ru and Pd known to be useful in the catalysis of the oxidation of CO. The catalytically active material may be provided on the substrate at the same time as the tin (IV) oxide is provided thereon, e.g. by co-impregnating the substrate with a sol and, in solution in the liquid medium of the sol, a material that is convertible to the catalytically active material by drying and firing, followed by drying and firing. Alternatively, the catalytically active material may be provided on the substrate after provision of the tin (IV) oxide thereon. If desired, the catalytically active material may be promoted or modified by the presence of other materials. Examples of promoters are transition metals such as Fe, Co, V, Ni and Mn. Said other material may be provided in the catalyst at the same or at a different time from the tin (IV) oxide or the catalytically active material.

As already indicated above, the dispersion for use in the invention may be a sol. An example of a suitable sol is a tin (IV) oxide sol known in the art. Such a sol may, for example, be prepared by peptising hydrated stannic acid with an alkali metal hydroxide such as KOH. Tin (IV) oxide prepared in this way will therefore contain the alkali metal which may be deleterious to the activity of the catalyst and may be difficult to remove from the final catalyst. Alternatively, a tin (IV) oxide dispersion prepared by peptising hydrous stannic oxide with a quaternary ammonium hydroxide can be used. The peptisation can be carried out to a sufficient extent to give a transparent aquasol or, alternatively, to such an extent to give a stable suspension wherein it is believed but has not been established that the suspension contains both a colloidal and a larger particle size non-colloidal component, the latter component being held in suspension by the former. Such methods are described in U.K. patent application No. 82 23390, now U.K. patent application No. 2,126,205.

Examples of suitable quaternary ammonium bases given in the above-mentioned application are tetramethylammonium hydroxide, tetraethylammonium hydroxide, methyltriethanolammonium hydroxide (known as Quram Base X61 and marketed by Emery Industries Inc. of Pennsylvania, U.S.A.) and 2-hydroxyethyltrimethylammonium hydroxide (known as Choline Base). The application gives the following methods of preparing the hydrous stannic oxide by way of example:

(a) Reaction of metal with aqueous $HNO_3$
(b) Acidification of suitable alkali metal compounds
(c) Hydrolysis of suitable salt solutions
(d) Deanionisation of suitable salt solution.

The application states that the tin (IV) oxide sol may be made by mixing the hydrated stannic oxide and the quaternary ammonium hydroxide together in water, optionally with heating. Solvents other than water may be present as, for example, in the case of Choline Base which is an approximately 45% solution of 2-hydroxyethyltrimethylammonium hydroxide in methanol.

When the dispersion is an aquasol, it may, if desired, be in admixture with other components for improving the performance of the final catalyst. For example, the sol may have dispersed therein particles of other ceramic oxides such as colloidal particles of alumina or non-peptisable stannic acid. As another example, the sol may be in admixture with an antimony (III) oxide sol. Thus, the presence of antimony (III) oxide may be useful since it is known as a catalyst the oxidation of CO.

Catalysts made according to this invention have been found to be particularly useful in the catalytic oxidation of CO. This, as indicated above, is the principal but not exclusive application of the catalysts. The catalysts have been found to be effective in catalysis of the oxidation of CO at temperatures as low as room temperature.

Several ways of carrying out the invention will now be described below by way of example only.

EXAMPLE 1

Preparation of sol

Granulated tin metal (50 g, A.R. quality) was added portionwise to a stirred mixture of concentrated nitric acid (200 ml) and water (150 ml). The addition of the tin was regulated so that the temperature of the stirred system did not exceed 50° C. The reaction mixture was allowed to stand at room temperature overnight. Clear supernate (300 ml) was decanted and the residue reslurried with water and adjusted to pH 8.0 by addition of ammonia liquid. After preliminary settling the residue was filtered and washed with distilled water (5 bed volumes). The washed filter cake was then stirred and heated with Quram XP61 base (27 ml), which is a 50% aqueous solution of methyltriethanolammonium hydroxide (ex Emery Industries Inc. of Pennsylvania, U.S.A.) until a clear amber sol was obtained with a volume of 160 ml. This was diluted with water to a volume of 240 ml.

A portion of this sol (50 ml) was mixed with 10 ml of Primal HA-8 (A polyvinyl acetate aqueous latex sold by Rohm and Haas (U.K.) Ltd).

Preparation of Catalyst

A monolith made of α-alumina, formed so as to have ~20 cells/sq inch, was impregnated with a tin (IV) oxide sol prepared as above. The monolith was dried at 75° C., reimpregnated, redried and fired at 350° C. for 24 hours to give a coating of $SnO_2$ thereon. The monolith was then sprayed with an ammoniacal solution of palladium acetate and platinum tetrammine chloride. It was then fired at 350° C. for one hour, washed with boiling distilled water and finally refired at 350° C.

The monolith was reduced at 150° C. in hydrogen and then enclosed in a laser can (see U.K. Pat. No. 2,083,687) containing a gas mixture including 6.8% CO and 3.4% by volume $O_2$. Gas was circulated within this container, over the monolith, and at regular intervals the gas was analysed for its oxygen and carbon monoxide contents.

It was found that the oxygen content within the laser can had dropped to half of its original value after a period of 5 hours at room temperature. At the same time, no dust was produced by the catalyst, neither did it give rise to an appreciable back pressure. This oxygen removal rate is very significant, considering the small mass of tin (IV) oxide (2.095 g) incorporated in the catalyst.

EXAMPLE 2

A catalyst was prepared in a similar manner to that described Example 1, except that a cordierite monolith (obtained (ex Corning Glass Works) was used as the substrate. The monolith had an open-porosity volume fraction of 0.31, a value very similar to that of the α-$Al_2O_3$ monolith used in Example 1. Its average pore size was substantially larger however with ~85% of the pore volume contained in pores of sizes between 2.5 and 20 μ.

The monolith was impregnated with the tin (IV) oxide sol and then dried three times before firing at 350° C. It was then impregnated twice more before a final firing. The subsequent impregnation with Pt and Pd salt solutions and other aspects of the preparation and testing were performed as described in Example 1.

When the catalyst was tested as described in Example 1, its ability to remove CO (expressed in litres of CO/sec xg tin (IV) oxide catalyst) was found to be an order of magnitude greater than that of the catalyst prepared in Example 1.

EXAMPLE 3

Preparation of Sol

A sol was prepared by adding an antimony (III) oxide sol to a tin (IV) oxide sol containing 220 gl$^{-1}$ of $SnO_2$ so that the resulting mixed sol had a Sn:Sb atomic ratio of 15.27:1. The tin (IV) oxide sol had been made by peptizing the products of the reactions between tin and nitric acid substantially as described herein with reference to U.K. patent application No. 82 23390. The antimony (III) oxide sol had been prepared as described in U.K. Pat. No. 1 563 214.

Preparation of Catalyst

A cordierite monolith with a cell density of 25 in$^{-1}$ and overall dimensions 100 mm×20 mm×11 mm was cleaned and dried. It was then impregnated with the above-prepared mixed sol. The impregnation step was repeated until no further increase in mass of the product was obtained. After the final impregnation, the monolith was dried and calcined for 6 hours at 300° C. in air. The monolith was then treated with a solution containing palladium acetate and ammoniacal platinum hydroxide before calcination at 300° C. and reduction at 150° C. for 1 hour in flowing hydrogen. The resulting catalyst was then tested in a recirculating gas mixture containing 6.8% CO and 3.4% $O_2$. The pumping speed for $O_2$ was found to be $3.3 \times 10^{-3}$ $1$ $sec^{-1}$ $gm^{-1}$ at ambient temperature. In contrast a catalyst tested under similar conditions and prepared in an identical way but without antimony, had a significantly lower pumping speed of $1.1 \times 10^{-3}$ $1$ $sec^{-1}$ $gm^{-1}$.

We claim:

1. A method of preparing a catalyst comprising providing a substrate with tin (IV) oxide support material and with catalytically active material comprising a precious metal wherein the tin (IV) oxide is provided by contacting the substrate with a dispersion of colloidal or non-colloidal particles in a liquid medium, said dispersion being convertible to tin (IV) oxide by drying and firing, followed by drying and firing.

2. A method as claimed in claim 1 wherein the substrate is in the form of a porous ceramic material.

3. A method as claimed in claim 1 wherein the dispersion is an aquasol.

4. A method as claimed in claim 3 wherein the sol has dispersed therein particles of one or more ceramic oxides other than tin (IV) oxide.

5. A method for the catalytic oxidation of carbon monoxide comprising contacting carbon monoxide with a catalyst as claimed in claim 1.

* * * * *